United States Patent
Zhao et al.

(10) Patent No.: US 6,525,546 B1
(45) Date of Patent: Feb. 25, 2003

(54) CAPACITIVE DISPLACEMENT SENSOR

(76) Inventors: Biao Zhao, No. 2, Unit 1, Building 2, Huixian District, Putuo Road, Guilin City, Guangxi Zhuangzu autonomous region, P.R. of China 541004 (CN); Zhiqiang Zhao, No. 2, Unit 1, Building 2, Huixian District, Putuo Road, Guilin City, Guangxi Zhuangzu autonomous region, P.R. of China 541004 (CN); Yi Li, No. 2, Unit 1, Building 2, Huixian District, Putuo Road, Guilin City, Guangxi Zhuangzu autonomous region, P.R. of China 541004 (CN)

( * ) Notice: Subject to any disclaimer, the term of this patent is extended or adjusted under 35 U.S.C. 154(b) by 0 days.

(21) Appl. No.: 09/700,722
(22) PCT Filed: Dec. 17, 1999
(86) PCT No.: PCT/CN99/00210
§ 371 (c)(1), (2), (4) Date: Nov. 28, 2000
(87) PCT Pub. No.: WO00/37882
PCT Pub. Date: Jun. 29, 2000

(30) Foreign Application Priority Data

Dec. 18, 1998 (CN) .......................................... 98126245

(51) Int. Cl.$^7$ ................................................ G01R 27/26
(52) U.S. Cl. ..................................................... 324/658
(58) Field of Search ................................ 324/660, 662, 324/663, 671, 687, 690, 603, 688, 658; 340/870.37; 257/659; 341/33; 361/181

(56) References Cited

U.S. PATENT DOCUMENTS 4,841,225 A * 6/1989 Meyer ...................... 324/61 R

* cited by examiner

Primary Examiner—Christine Oda
Assistant Examiner—Etienne P LeRoux
(74) Attorney, Agent, or Firm—Rader Fishman & Grauer

(57) ABSTRACT

The invention relates to a capacitive displacement sensor, in which the adjacent emitting electrodes (12) in the same pitch T of the subsidiary scale are arranged on both sides of a reflecting electrode (11) respectively, the emitting electrodes (12) transmitting all the different signals are involved in a pitch T, and the geometric gaps of adjacent emitting electrodes (12) along the longitudinal direction of subsidiary scale are zero. In another pitch T separating several pitches T with aforesaid pitch, the arrangement of its emitting electrodes (12) is in alternation with the arrangement of above mentioned emitting electrodes (12). The fabrication difficulty and cost can be lowered, and the measuring precision can be improved.

31 Claims, 4 Drawing Sheets

CAPACITIVE DISPLACEMENT SENSOR

TECHNICAL FIELD

The invention relates to a capacitive sensor for length and angle measurement.

BACKGROUND ART

Since the coming out of capacitive displacement sensor for large displacement measuring in the seventies of the century, due to its advantages on low power consumption, high integration, small volume, and low cost etc, extensive applications had been achieved rapidly on digital display measuring tools and other length measuring devices. However, because of its lower resolution and measuring precision in comparison with the sensors like the gratings and synchronous inductor etc, therefore a certain limitation occurs in aspects of high precision measurement. While the simplest and most effective method for raising resolution and precision of capacitive displacement sensor is reduction of the spacings between the emitting electrodes 12 of a subsidiary scale and reduction of the spacings among the reflecting electrodes 10 of a main scale simultaneously, as shown in FIG.6. According to arrangement for the prior art's emitting electrodes 12 of subsidiary scales, in a pitch T of the subsidiary scale, 2N (N is an integer, 2N=8 to be set in the drawing) emitting electrodes transmitting different signals are involved. If the various emitting electrodes 12 in a pitch T are numbered as 1,2,3,4,5,6,7,8 according to the position sequence, there are a plurality of emitting electrodes 12 with a pitches T, and emitting electrodes in each pitch T must have gaps S and a receiving electrode 11 is placed on one side of the emitting electrode. If the spacing t between the emitting electrodes 12 were reduced according to aforesaid form of arrangement, then the gaps between the adjacent emitting electrodes shall be extremely small so its technological difficulty is obvious. Moreover since there is a gap S between the adjacent emitting electrodes 12, therefore discontinuity of signals shall be presented while the reflecting electrode 10 on the main scale traverses two emitting electrodes 12, thereby precision of the sensor is influenced. In the patents (CN87102624) (CN1038421), it was proposed to take out the emitting electrodes on the subsidiary scale originally concentrated in a pitch T respectively, then to dispose them on the same positions of different pitches T separately so that each emitting electrode being broadened, and improving its resolution but not increasing the technological difficulty. But a group of emitting electrodes in this kind of arrangement shall correspond to multiple reflecting electrodes respectively, so that no complete signal can be synthesized on a reflecting electrode. A reflecting electrode must be coupled with a receiver electrode once again to compose a complete synthesized signal. However the variation of capacitance is directly proportional to the square of the distance between both capacitor plates, thus an extremely high parallelism of the main scale and the subsidiary scale is required, otherwise the precision cannot be reached, consequently its application shall be rather difficult. Furthermore, when the reflecting electrode is traversing the overlapping portions of two emitting electrodes, the sensor precision shall also be influenced due to said signal discontinuity.

DISCLOSURE OF THE INVENTION

An object of the invention is to propose an improved capacitive displacement sensor, which can not only improve the resolution and precision of capacitive displacement sensor, meanwhile the fabrication technological difficulty is also not excessively increased, and the applicable function of improved capacitive displacement sensor can be conveniently extended.

The capacitive displacement sensor of the invention comprises a main scale and a subsidiary scale arranged in a relatively mutual movable mode; 2N (N is an integer) emitting electrodes 12 are disposed on the said above subsidiary scale for transmitting different signals, said emitting electrodes 12 being perpendicular to the subsidiary scale and arranged in each pitch T; a receiving electrode 11, said above emitting electrodes 12 and reflecting electrodes 10 opposing the receiving electrode 11 are installed on the said main scale; and an electronic circuit for measuring the relative displacement by means of the coupling capacitance between said above emitting electrodes 12, receiver electrode 11, and reflecting electrodes 10, wherein, the adjacent emitting electrodes 12 in the same pitch T of the subsidiary scale are arranged on both sides of the receiver electrode 11 respectively, and all the emitting electrodes 12 transmitting different signals still are involved in a pitch T, the geometrical gaps of adjacent emitting electrodes 12 along the longitudinal direction of said subsidiary scale being zero, i.e. the neighboring sides between the adjacent emitting electrodes 12 located on a straight line. Corresponding to arrangement of the emitting electrodes 12 in each pitch T, the arrangement sequence of the emitting electrodes 12 in another pitch T separating several pitches with the said above pitch T is alternatively arranged with the aforesaid emitting electrodes 12, and the gap among the neighboring two groups several pitches T.

A plurality of units formed according to the mode of arranging emitting electrodes on both sides of receiver electrode 11 respectively, and the geometric gaps between the adjacent emitting electrodes being zero may be disposed, along subsidiary scale wherein a spacing of several pitches T occurred among the two adjacent pitches, and the arrangement sequences of the emitting electrodes 12 in the two adjacent units are alternatively allocated.

The form of reflecting electrodes 10 of the main scale may be a tumbled letter "T" shape relatively to the main scale.

Also, a pitch of the reflecting electrodes 10 may equal a pitch T of the emitting electrodes 12.

The reflecting electrode 11 may be rectangular shape, its length may be integer times of the pitch T of emitting electrodes 12.

Furthermore, both ends of receiver electrode 11 may be T/2 shorter than the both outer ends of emitting electrode 12 respectively.

BRIEF DESCRIPTION OF ATTACHED DRAWINGS

THE OPTIMUM REALIZATION MODE OF THE INVENTION

For convenience, the same named components in FIGS. 1,2,3,5,6 and emitting electrodes 12 have the same serial numbers, and all of them are illustrated by the output signals of emitting electrode 12.

Figure 1:
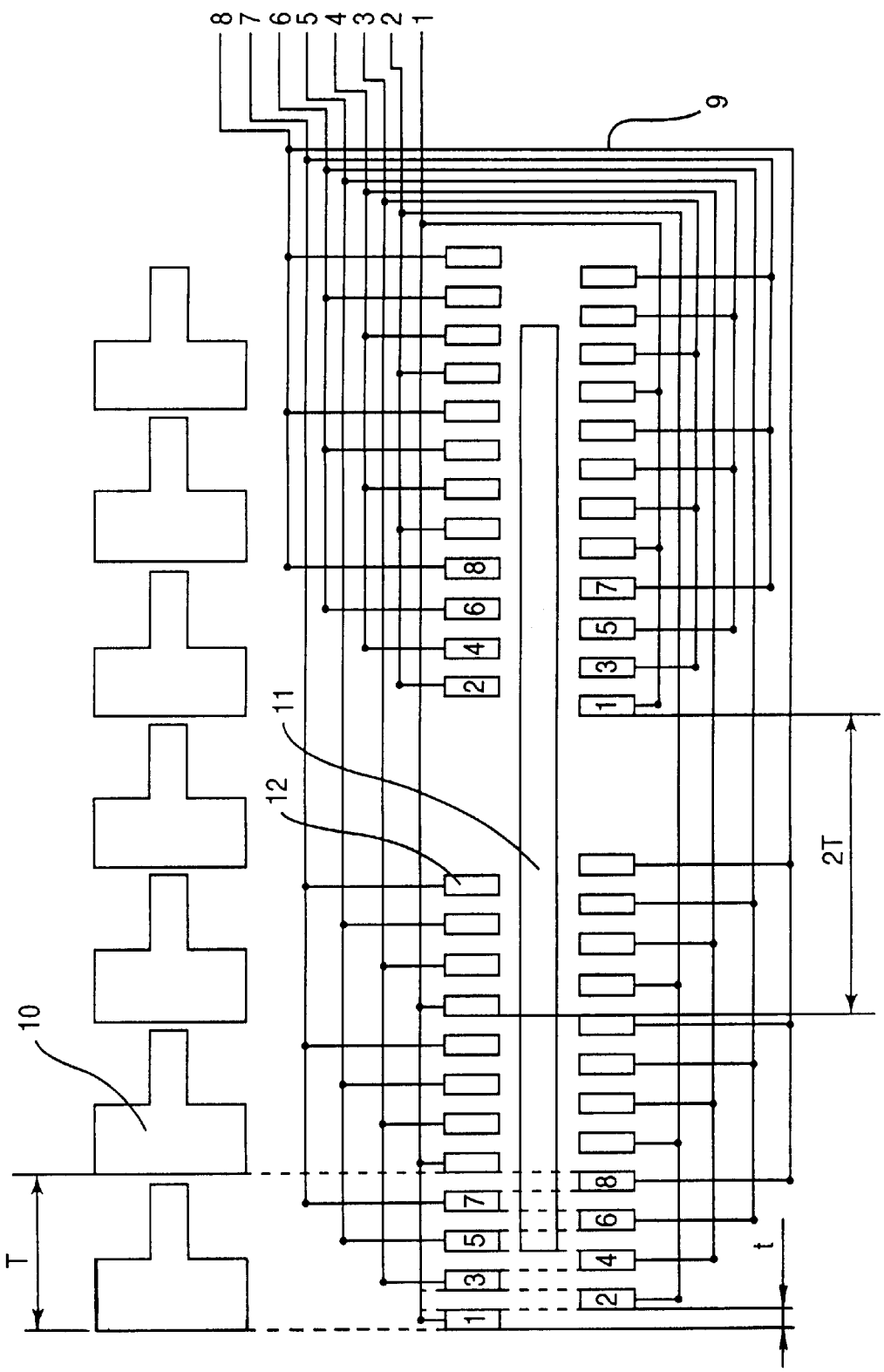
FIG. 1 is plane schematic of an embodiment in the invention.
Figure 2:
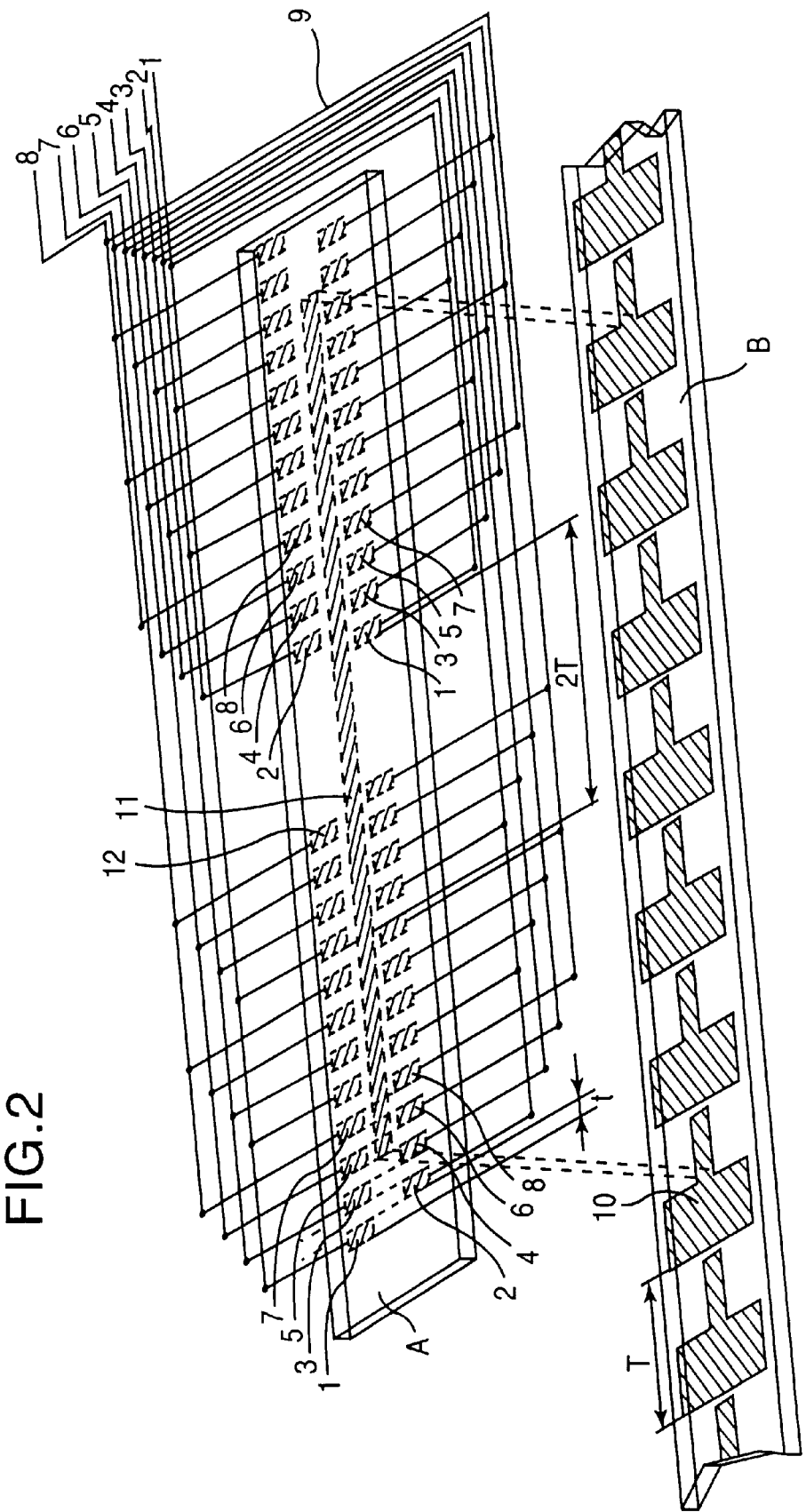
FIG. 2 is a perspective view of an embodiment in the invention.
Figure 3:
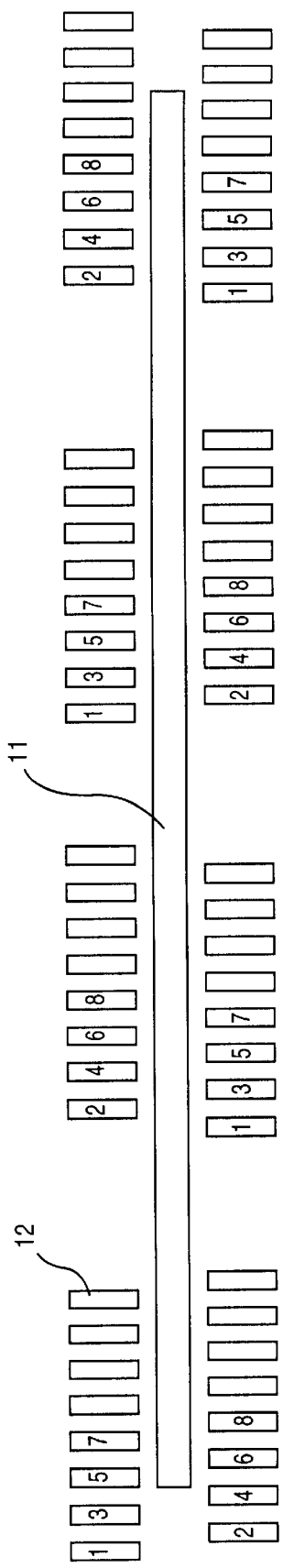
FIG. 3 is an electrode arrangement of subsidiary scale in another embodiment of the invention.

As shown in FIG. 1 or FIG.2, the invention comprises a subsidiary scale A and a main scale B, which are omitted in FIG. 1, A pencil shaped receiver electrode 11 is located in the middle portion of subsidiary scale A, a row of emitting electrodes 12 are placed on both sides of the receiver electrode 11 respectively, the width and spacing of an emitting electrode 12 are equal, and the emitting electrodes 12 are divided into two groups, i.e. the front and back groups, the arrangement of emitting electrodes 12 in a pitch T of the frontgroup is that upper side of the receiver electrode 11 are 1,3,5,7 of the emitting electrodes 12, and lower side of the receiver electrode 11 are 2,4,6,8 the arrangement of emitting electrodes 12 in a pitch T of the backgroup is that upper side of the receiver electrode 11 are of 2,4,6,8, the emitting electrodes 12, and lower side of the receiver electrode 11 are 1,3,5,7, and the pitch number of the frontgroups and backgroups are equal (there are three pitches respectively in the diagram), that means, various pitches in the front and back groups are in one-to-one correspondence. A series of electrically insulating reflecting electrodes 10 are placed on the main scale, which are in tumbled letter "T" shape, and the pitch of reflecting electrode 10 equals the pitch T of emitting electrode 12. Adopting above arrangement, spacing between the adjacent emitting electrodes 12 of the same row on the subsidiary scale can be doubled, while the raised practical effect is to lower the fabrication difficulty, meanwhile a complete synthesized signal can be surely composed on a reflecting electrode 10.

Employing the alternating arrangements of the emitting electrodes 12 in front and back groups, precision error resulted from asymmetric installation of the main and subsidiary scales can be effectively eliminated. When the main scale deviates upwards or downwards relatively to the subsidiary scale (pointing to inside of FIG.2), the coupling area of emitting electrodes 12 on the upper or lower side (inside of FIG.2) of receiver electrode 11 enlarged, the coupling area of lower or upper side (outside of FIG.2) reduced, but due to the alternative arrangements of the 12 in the front and back groups, the overall coupling area of the various routes are guaranteed to be equal, no changes of the synthesized signal shall be resulted, measuring precision shall not be affected, consequently the requirement on installation precision of the main and subsidiary scales shall be lowered. Width of the emitting electrode 12 equals the spacing t of the emitting electrodes 12, i.e, the gap between the adjacent emitting electrodes is zero. When the reflecting electrode 10 is traversing two adjacent emitting electrodes 12, continuity of the synthesized signal is not affected.

Moreover, generally speaking, in a certain distance between the various reflecting electrodes 10 must be separated, then the signals of emitting electrodes 12 can be effectively received. While in the invention, the reflecting electrode 10 is a tumbled letter T shape, which shortened the distance between various emitting electrodes 10 via the hump part of T , and the coupling area of the reflecting electrode and the receiver electrode can be enlarged, signal intensity is enhanced, thereby the signal-noise ratio on the receiver electrode 11 is reduced. Since these measures have been adopted, precision is also raised.

As shown in FIG. 1, the receiving electrode is rectangular shape, its length is integer times of the pitch T of the emitting electrode 12, the length of the receiving electrode 11, as shown in FIG. 1, is 6T. To avoid the so-called edge effect, both ends of the receiver electrode 11 are T/2 shorter than the both outer ends of emitting electrode 12 respectively. To prevent the occurrence of short circuit phenomenon of the emitting electrode 12, a pitch between the emitting electrodes 12 of the frontgroup and the backgroup is voided for not placing emitting electrodes 12. The emitting electrodes 12 and receiver electrode 11 are connected to the integrated circuit 22 of FIG. 5 via the wire 9.

FIG. 2 is an arrangement schematic of the subsidiary scale in of the invention. Multigroups of alternating arrangement have been adopted for the invention, i.e. several groups of alternatively arranged emitting electrodes 12 are intercepted. There are four groups of emitting electrodes 12 shown in the FIG. 1 and FIG. 2. An arrangement of emitting electrodes 12 of every two adjacent groups is alternating, and a gap of one pitch T exists between the two adjacent groups.

Figure 4:
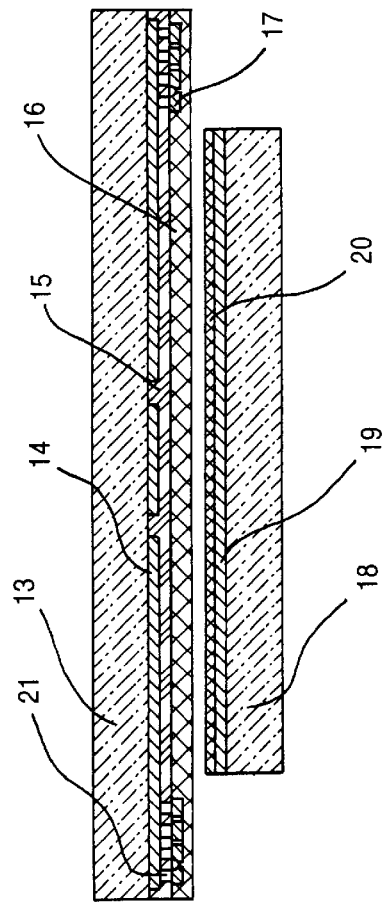
FIG. 4 is a structure diagram for realizing the invention.

As shown in FIG. 4, the following method can be employed for producing the subsidiary and main scales in the invention. A sheet of electrically conducting layer is generated on the substrate 13 of electronic ceramics or glass by a vapor phase deposition, the patterns of electrodes 14, 19 are made by the photolithography, i.e. the thin film circuit's technology, then a sheet of insulating material is evenly coated on the electrode sheet 14 by screen printing to serve as an isolation layer 15, a window 21 is reserved at the connecting point of electrode layer 14, i.e. thick film circuit fabrication technology, then the patterns of wire layer 17 is produced by the thin film circuit fabrication technology, finally the protection layers 16, 20 are produced by the thick film circuit fabrication technology. Because the thin film circuit fabrication technology and thick film circuit fabrication technology have alternatively been used, not only the fabrication precision of electrode layers 14, 19 and the wire layer 17 can be guaranteed, the fabrication cost of main and subsidiary scales are also fully lowered.

Figure 5:
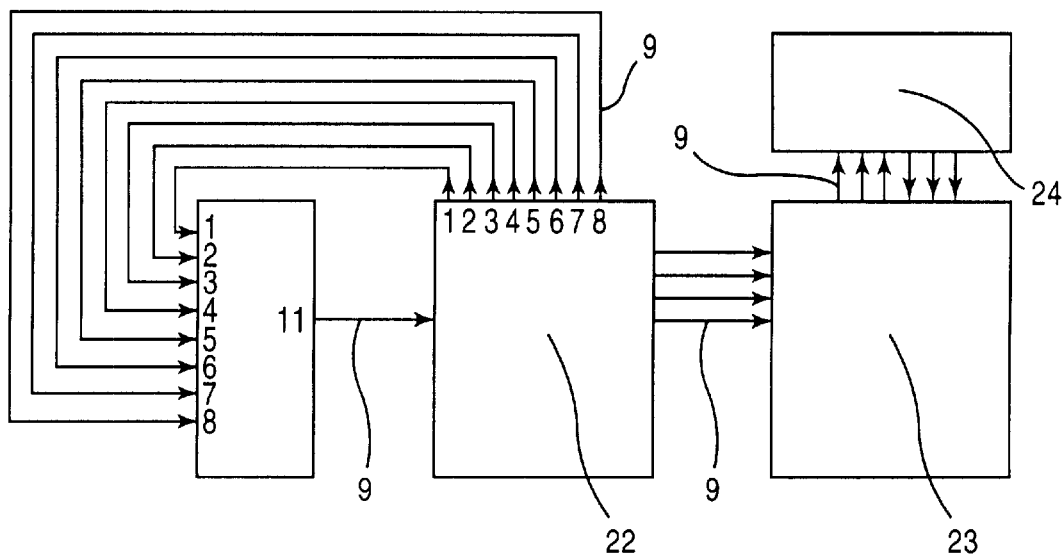
FIG. 5 is an electronic circuit diagram for realizing the invention.
Figure 6:
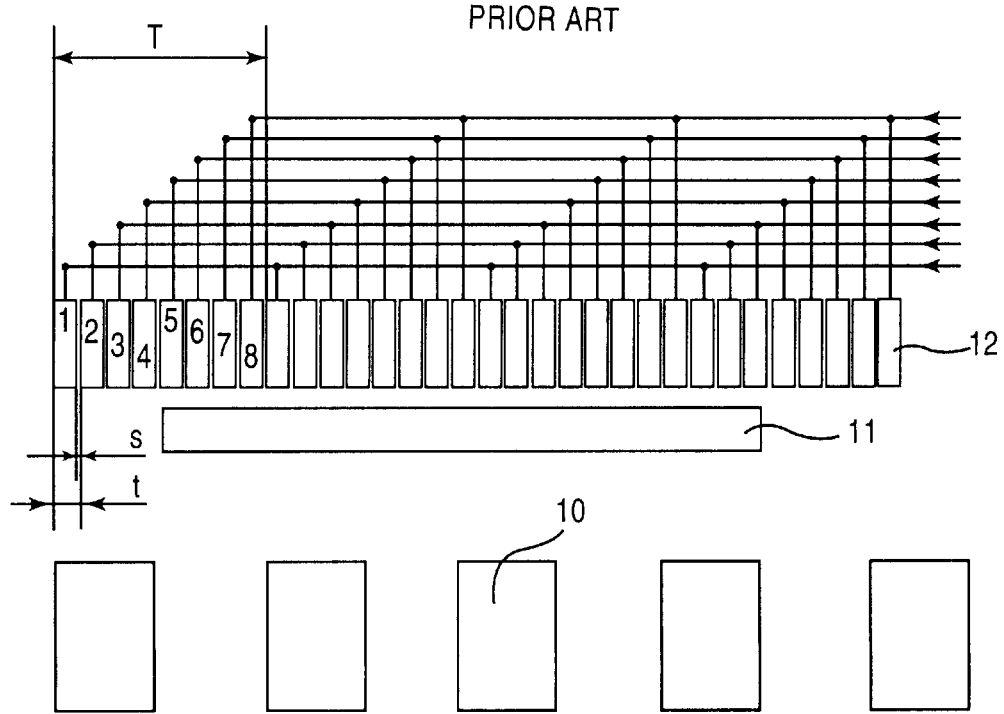
FIG. 6 is a structure schematic of the capacitive displacement sensor in background art.

As shown in FIG. 5, the form of two pieces of integrated circuits 22, 23 is used for producing an electronic circuit in the invention, wherein a piece of integrated circuit being employed for generating and outputting transmitted signals to the emitting electrodes 12, and for receiving synthesized signals from the receiver electrode 11 and carrying out signal amplification, demodulation and performing digital-to-analog, analog-to-digital conversion, then to transfer the digital signals to another piece of integrated circuit 23, and to carry out data processing and realize various functions, finally again via the wire 9 connecting to a display control unit, displaying numeral values on the display control unit and performing various functional operations. Adopting above structure form, not only the features of high integration in the capacitive displacement sensor can be retained, but also enables it to be conveniently applied for measurement in the fields of pressure, weight, volume, content, temperature etc.

The arrangement of emitting electrodes 12 and reflecting electrodes 10 are varied in the invention for a endless connection, and can also be applied for angle displacement measurement.

INDUSTRIAL APPLICABILITY

Through the definite arrangements of the various electrodes on the main and subsidiary scales, the capactive displacement sensor of the invention has the following advantages: By the same time of elongating the distance between the emitting electrodes of subsidiary scale, composition of a synthesized signal on a reflecting electrode of the main scale complete can be guaranteed, the error resulted on the reflecting electrode in traversing the adjacent emitting electrodes and the error resulted from the asymmetry in upper and lower directions on main and subsidiary scale installation can be eliminated, thus not only the production difficulty and cost of the main and subsidiary scales can be lowered, the precision improved, but the mounting precision requirements are not enlarged on any application. Furthermore, the reflecting electrode is designed to be tumbled T shaped, the coupling area of the reflecting electrode and the receiver electrode can be enlarged, signal intensity enhanced, and the signal-noise ratio of the receiver electrode reduced.

Advantages of the invention also lie in: electronic ceramics or electronic glass are employed as substrates in the main and subsidiary scales, which can guarantee that stable precision can be retained under various environmental conditions. Preparation to be carried out by alternate application of thick film circuit fabrication technology and thin film circuit fabrication technology not only guaranteed the higher accuracy required in production of the electrode layer and the wire layer, but also simplified the fabrication of isolation layer and protection layer which are not requiring higher accuracy, as a result to lower the fabrication cost. Furthermore, the form of two pieces of integrated circuits being adopted for electronic circuit fabrication, under the premise of retaining the original high integration feature of the capacitive displacement sensor, is convenient for function extension, and its application field is expanded.

What is claimed is:

1. A capacitive displacement sensor comprising:
    a subsidiary scale, said subsidiary scale including a plurality of emitting electrodes and a receiver electrode
    said plurality of emitting electrodes having a plurality of electrode groups, said plurality of electrode groups have a first electrode group and a second electrode group, said first electrode group having a plurality of first electrodes of said plurality of emitting electrodes, said second electrode group having a plurality of second electrodes of said plurality of emitting electrodes, and
    said receiver electrode having a first side and a second side opposite to said first side, said first electrode group being spaced from said first side, said second electrode group being spaced from said second side,
    said first side being closer to said first electrode group than to said second electrode group,
    said second side being closer to said second electrode group than to said first electrode group.

2. A capacitive displacement sensor according to claim 1, wherein a first electrode of said plurality of first electrodes corresponds with a second electrode of said plurality of second electrodes.

3. A capacitive displacement sensor according to claim 1, wherein an emitting electrode of said a plurality of emitting electrodes has an emitting electrode length and an emitting electrode width, said emitting electrode length being longer than said emitting electrode width.

4. A capacitive displacement sensor according to claim 1, wherein said receiver electrode has a receiver electrode length and a receiver electrode width, said receiver electrode length being longer than said receiver electrode width.

5. A capacitive displacement sensor according to claim 4, wherein said first group extends along said subsidiary scale beyond said receiver electrode length.

6. A capacitive displacement sensor according to claim 4, wherein said second group extends along said subsidiary scale beyond said receiver electrode length.

7. A capacitive displacement sensor according to claim 1, wherein an emitting electrode of said plurality of emitting electrodes has a length and a width, said width of said emitting electrode being equal to a width of another emitting electrode of said plurality of emitting electrodes.

8. A capacitive displacement sensor according to claim 1, wherein an emitting electrode of said plurality of emitting electrodes is between and equally spaced from two emitting electrodes of said plurality of emitting electrodes.

9. A capacitive displacement sensor according to claim 1, wherein a first emitting electrode of said first electrode group is between two other first emitting electrodes of said first electrode group, a first space being between said first emitting electrode and one of said two other first emitting electrodes.

10. A capacitive displacement sensor according to claim 9, wherein said first space is equal to a width of said first emitting electrode.

11. A capacitive displacement sensor according to claim 9, wherein another first space is between said first emitting electrode and another of said two other first emitting electrodes.

12. A capacitive displacement sensor according to claim 9, wherein said first electrode group has a plurality of first spaces and said second electrode group has a plurality of second spaces,
    a first space of said plurality of first spaces being adjacent said first emitting electrode and a second space of said plurality of second spaces being adjacent said second emitting electrode,
    said first space being opposite to said second emitting electrode and said second space being opposite to said first emitting electrode.

13. A capacitive displacement sensor according to claim 1, further comprising:
    a main scale, said main scale having a plurality of reflecting electrodes.

14. A capacitive displacement sensor according to claim 13, wherein said main scale is spaced from said subsidiary scale.

15. A capacitive displacement sensor according to claim 13, wherein the length of a reflecting electrode of said plurality of reflecting electrodes is an integer multiple of a width of an emitting electrode of said plurality of emitting electrodes.

16. A capacitive displacement sensor according to claim 13, wherein a reflecting electrode of said plurality of reflecting electrodes is an electrically insulating reflecting electrode.

17. A capacitive displacement sensor according to claim 13, wherein a reflecting electrode of said plurality of reflecting electrodes is spaced from an adjacent reflecting electrode of said plurality of reflecting electrodes.

18. A capacitive displacement sensor according to claim 13, wherein a reflecting electrode of said plurality of reflecting electrodes is in the shape of a "T", the hump of said "T" being adjacent one reflecting electrode of said plurality of reflecting electrodes and the stem of said "T" being adjacent another reflecting electrode of said plurality of reflecting electrodes.

19. A capacitive displacement sensor comprising:
    a plurality of emitting electrodes, said plurality of emitting electrodes having a plurality of first electrodes and a plurality of second electrodes; and
    a receiver electrode, said receiver electrode having a first side and a second side opposite to said first side, said plurality of first electrodes being spaced from said first side, said plurality of second electrodes being spaced from said second side, said first side being closer to said plurality of first electrodes than to said plurality of second electrodes, said second side being closer to said plurality of second electrodes than to said plurality of first electrodes; wherein a first space is adjacent a first emitting electrode of said plurality of first electrodes, a second space is adjacent a second emitting electrode of said plurality of second electrodes, and said first space is opposite to said second emitting electrode and said second space is opposite to said first emitting electrode.

20. A capacitive displacement sensor according to claim 19, wherein said first emitting electrode is between two other first emitting electrodes of said plurality of first electrodes, said first space being between said first emitting electrode and one of said two other first emitting electrodes.

21. A capacitive displacement sensor according to claim 19, wherein said second emitting electrode is between two other second emitting electrodes of said plurality of second electrodes, said second space being between said second emitting electrode and one of said two other second emitting electrodes.

22. A capacitive displacement sensor according to claim 19, wherein said first space is equal to a width of said second emitting electrode.

23. A capacitive displacement sensor according to claim 19, wherein said second space is equal to a width of said first emitting electrode.

24. A capacitive displacement sensor according to claim 19, wherein said first space is equal to a width of said first emitting electrode.

25. A capacitive displacement sensor according to claim 19, wherein said second space is equal to a width of said second emitting electrode.

26. A capacitive displacement sensor for length and angle measurement, comprises a main scale and a subsidiary scale being arranged in a relatively mutual movable mode along the direction of displacement and measurement, 2N (N is an integer) emitting electrodes (12) being disposed on said subsidiary scale for transmitting different signals, said emitting electrodes (12) being perpendicular to said direction of displacement and being arranged in each pitch T, and a receiver electrode (11) being disposed on said subsidiary scale, a reflecting electrodes (10) opposed to said emitting electrodes(12) and said receiver electrodes (11) being installed on said main scale, and an electronic circuit for measuring the relative displacement of said two scales by means of the coupling capacitance between said emitting electrodes (12), receiver electrode (11), and reflecting electrodes (10), wherein the adjacent emitting electrodes(12) in a pitch T of the subsidiary scale being arranged on both sides of the receiver electrode (11) respectively, and all the emitting electrodes(12) transmitting different signals still being involved in a pitch T, the geometrical gaps of adjacent emitting electrodes (12) along the direction of displacement measurement being zero, i.e. the perpendicular distance along the direction of displacement measurement between the neighboring sides of the adjacent emitting electrodes (12) perpendicular to the direction of displacement measurement being zero, corresponding to the arrangement of the emitting electrodes (12) in each pitch T, the arrangement of the emitting electrodes (12) in another pitch T separating several pitches with the above said pitch T being alternatively arranged with the aforesaid emitting electrodes(12), the gap among the neighboring two groups being one pitch T, and said reflecting electrodes (10) of the main scale being tumbled T shaped.

27. The capacitive displacement sensor according to claim 26, wherein the pitch of the reflecting electrode (10) equals to the pitch T of the emitting electrode (12).

28. The capacitive displacement sensor according to claim 26, wherein the receiver electrode (11) is rectangular shape, its length is integer times of the pitch T of emitting electrodes (12).

29. The capacitive displacement sensor according to claim 28, wherein both ends of the receiver electrode (11) are T/2 shorter than the both outer ends of emitting electrode (12) respectively.

30. The capacitive displacement sensor according to claim 26, wherein the main and subsidiary scales are such produced as that thick film circuit fabrication technology and thin film circuit fabrication technology are alternatively used on a substrate (13), (18) of electronic ceramics or glass, that is, electrode layer (14), (19) and wire layer (17) are produced by the thin film circuit fabrication technology, isolation layer(15) and protection layers(16), (20) are produced by the thick film circuit fabrication technology.

31. The capacitive displacement sensor according to claim 26, wherein the form of two pieces of integrated circuit (22), (23) is used for producing said electronic circuit, wherein a piece of integrated circuit (22) is employed for generating signals to emitting electrodes (12), receiving signals from the receiver electrodes (11), and for carrying out signal amplification, demodulation and performing digital to analog conversion to the signals of receiver electrodes (11), another piece of integrated circuit (23) carries out data processing and realizes various functions.

* * * * *